United States Patent [19]
Consolo

[11] Patent Number: 5,560,820
[45] Date of Patent: Oct. 1, 1996

[54] SELF-CLEANING FLUID FILTRATION SYSTEM

[76] Inventor: Ralph G. Consolo, 6668 Gates Mills Blvd., Gates Mills, Ohio 44040

[21] Appl. No.: 590,769

[22] Filed: Jan. 24, 1996

[51] Int. Cl.$^6$ ................................................. B01D 33/52
[52] U.S. Cl. ......................... 210/104; 210/106; 210/121; 210/356; 210/409; 210/416.1; 210/437; 210/452; 137/41; 137/547
[58] Field of Search ................................... 210/104, 106, 210/121, 356, 409, 416.1, 437, 452, 97, 103, 359, 410, 411, 412, 451, 455, 457, 459, 497.01; 137/41, 547

[56] References Cited

U.S. PATENT DOCUMENTS

| | | | |
|---|---|---|---|
| 1,696,313 | 12/1928 | Liddell | 210/356 |
| 2,724,508 | 11/1955 | Luther | 210/356 |
| 3,276,594 | 10/1966 | Gwilliam | 210/356 |
| 3,334,748 | 8/1967 | Bozek | 210/350 |
| 3,542,200 | 11/1970 | Durr . | |
| 4,937,005 | 6/1990 | Shelstad . | |
| 5,143,615 | 9/1992 | Roy et al. | 210/416.1 |

Primary Examiner—W. L. Walker
Attorney, Agent, or Firm—Tarolli, Sundheim, Covell, Tummino & Szabo

[57] ABSTRACT

A self-cleaning fluid filtration system is presented and which includes a tank having a bottom wall and a side wall together forming a fluid chamber. An inlet is located in the bottom wall for receiving fluid to be filtered. A tube extends from the inlet upwardly into the chamber for directing fluid upwardly through the tube. The tube has perforations therein for directing fluid to flow outwardly therefrom. A platform is carried by the tube intermediate its ends and extends radially outward therefrom toward the side wall of the tank. A perforated rigid basket in the chamber surrounds the tube and has an open lower end mounted to the upper surface of the platform and a closed upper end located above the upper end of the tube. A collapsible fluid-permeable filter bag is located in the chamber intermediate the tube and the basket. The filter bag has an uncollapsed condition while fluid flows through the tube and a collapsed condition when fluid flow terminates whereupon the bag collapses causing dirt clinging to the inner surface of the filter bag to fall from the walls thereof by gravity forces.

13 Claims, 2 Drawing Sheets

SELF-CLEANING FLUID FILTRATION SYSTEM

BACKGROUND OF THE INVENTION

This invention relates to the art of fluid filtration systems and, more particularly, to a self-cleaning system which is particularly applicable for reclaiming contaminated or dirty fluid, such as waste water in a vehicle washing system.

It is known in the art to provide fluid filtration systems for filtering fluid containing dirt, as in a vehicle washing system. Such filtration systems have included filtration tanks into which waste water is supplied and filtered by passing it through a filter bag. The filtered water is reclaimed for reuse in the vehicle washing system. It has been found that a filter bag having a filter rating on the order of 75 microns must be changed after washing approximately 500 vehicles. This results in considerable down time and, hence, expense to the operator of a vehicle washing system. It is desirable that such a vehicle washing system be provided with filters which are finer than 75 microns and preferably on the order of 50 or 25 microns and wherein several thousand vehicles may be washed before changing the filter or filters. Consequently, it would be advantageous to provide such a filter system which includes a self-cleaning filter.

A self-cleaning fluid filtration system is disclosed in the R. J. Shelstad U.S. Pat. No. 4,937,005. Shelstad's filtration system is intended to be used in a vehicle wash system or the like. The system includes a collapsible filter tube located in a tank into which dirty water is introduced by way of an inlet hose. The dirty water enters into the top of a chamber which coaxially surrounds the filter tube. The dirty water flows radially inward through the filter tube into the interior of the tube and then exits as filtered water from the interior of the tube by way of an outlet hose. The filter tube is movable between an uncollapsed filter position and a collapsed purge position. The movement of the filter tube is controlled by a timer which automatically determines when to actuate a cylinder and piston arrangement to drive the tube between the filter position and the purge position.

In Shelstad, the filter tube does not take the form of a typical filter bag, which is a replaceable item. Instead, the filter tube is provided at its lower end with a metal disk which is secured at its periphery to the filter tube and an upper disk which is secured at its periphery to the upper end of the filter tube. The filter tube may need to be replaced after a substantial number of washing cycles which may cause tearing and deterioration of filter tube. It is difficult to disassemble the filter tube from the disks and then repair and/or replace the filter tube.

The L. Durr U.S. Pat. No. 3,542,200 discloses a fluid filtering system employing a central perforated inlet conduit which permits water to flow upward through the conduit and then be directed radially outward through apertures in the conduit into a filter chamber which is surrounded by a lint bag located within a metal perforated basket. It is to be noted that the lint bag is easily removable but is not self-cleaning.

SUMMARY OF THE INVENTION

An object of the invention is to provide an improved self-cleaning fluid filtration system employing a filter bag which is positioned in an inverted upstanding position and held in a filtering condition under water pressure and then collapses upon itself due to gravity when water pressure is removed.

It is still a further object of the present invention to provide such a system wherein the self-cleaning collapsible filter bag collapses from time-to-time because of a measured fluid level as opposed to a timed event.

In accordance with the present invention there is provided a self-cleaning fluid filtration system which includes a tank having a bottom wall and a side wall that extends upwardly form the bottom wall and together with the bottom wall forms a fluid chamber. An inlet is provided in the bottom wall for receiving fluid to be filtered. A tube extends upwardly from the inlet into the chamber for directing fluid upwardly through the tube. The tube is perforated for directing fluid within the tube to flow outwardly therefrom. A platform is carried by the tube intermediate its ends and extends radially outward toward the inner surface of the side wall of the tank. A perforated basket is located in the chamber and surrounds the tube and has an open lower end having a peripheral edge and which is mounted on the upper surface of the platform. The basket has a closed upper end located above the upper end of the tube. A collapsible fluid-permeable filter bag is located in the chamber intermediate the tube and the basket and has an open lower end having a peripheral lip extending over the lower peripheral edge of the basket between the basket and the upper surface of the platform. The filter bag has an uncollapsed condition while fluid flows through the tube and then radially against the bag displacing the bag radially outward and upwardly against the basket as fluid flows through the filter bag and is filtered thereby and then through the basket within the tank. The filter bag also has a collapsed condition when fluid flow terminates whereupon the bag collapses upon itself causing dirt and the like clinging to the inner surface of the filter bag to fall from the walls thereof by gravity forces and fall toward the upper surface of the platform. A dirt compartment is located below the platform and a dirt outlet is located in the platform intermediate the filter bag and the inlet so that dirt and unfiltered fluid may flow downwardly therethrough into the dirt compartment. A dirty fluid outlet extends from the dirt compartment permitting dirt and unfiltered fluid to flow outwardly therethrough from the dirt compartment. A clean fluid outlet extends from the tank permitting filtered fluid to flow out of the tank.

In accordance with a more limited aspect of the present invention, there is provided a float switch for use in controlling termination of fluid flow when the fluid level in the tank reaches a predetermined level whereupon the filter bag collapses upon itself causing dirt clinging to the inner surface thereof to fall from the walls of the bag.

Still further in accordance with the present invention, the float switch is used to control fluid flow upwardly into the tube when the level of fluid in the tank drops to a particular level. The fluid flow is propelled by a pump or the like to drive the filter bag to an uncollapsed condition within the basket for filtering fluid.

In accordance with a still further aspect of the present invention, a self-cleaning filter system is provided employing a filter bag which is mounted in an inverted position and wherein the bag collapses from time to time based on the fluid level.

BRIEF DESCRIPTION OF THE DRAWINGS

The foregoing and other advantages of the invention will become more readily apparent from the following description of the preferred embodiment of the invention as taken in conjunction with the accompanying drawings, which are a part hereof, and wherein.

DESCRIPTION OF THE PREFERRED EMBODIMENT

Figure 1:
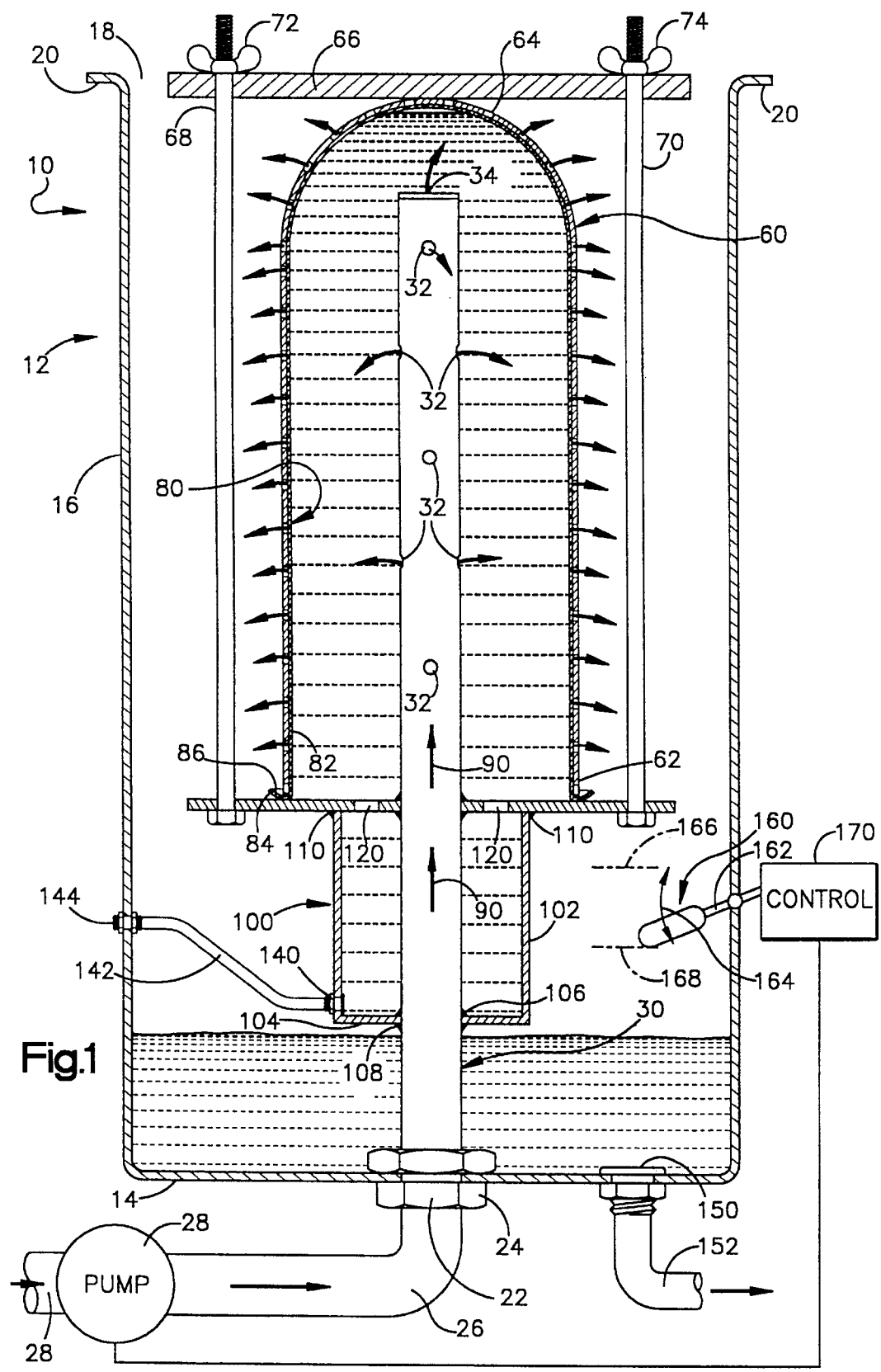
FIG. 1 is an elevational view, partly in section, of a filter assembly employing the invention with the filter bag illustrated in an uncollapsed condition; and, FIG. 2 is a view similar to that of FIG. 1 but showing the filter bag in a collapsed condition.
Figure 2:
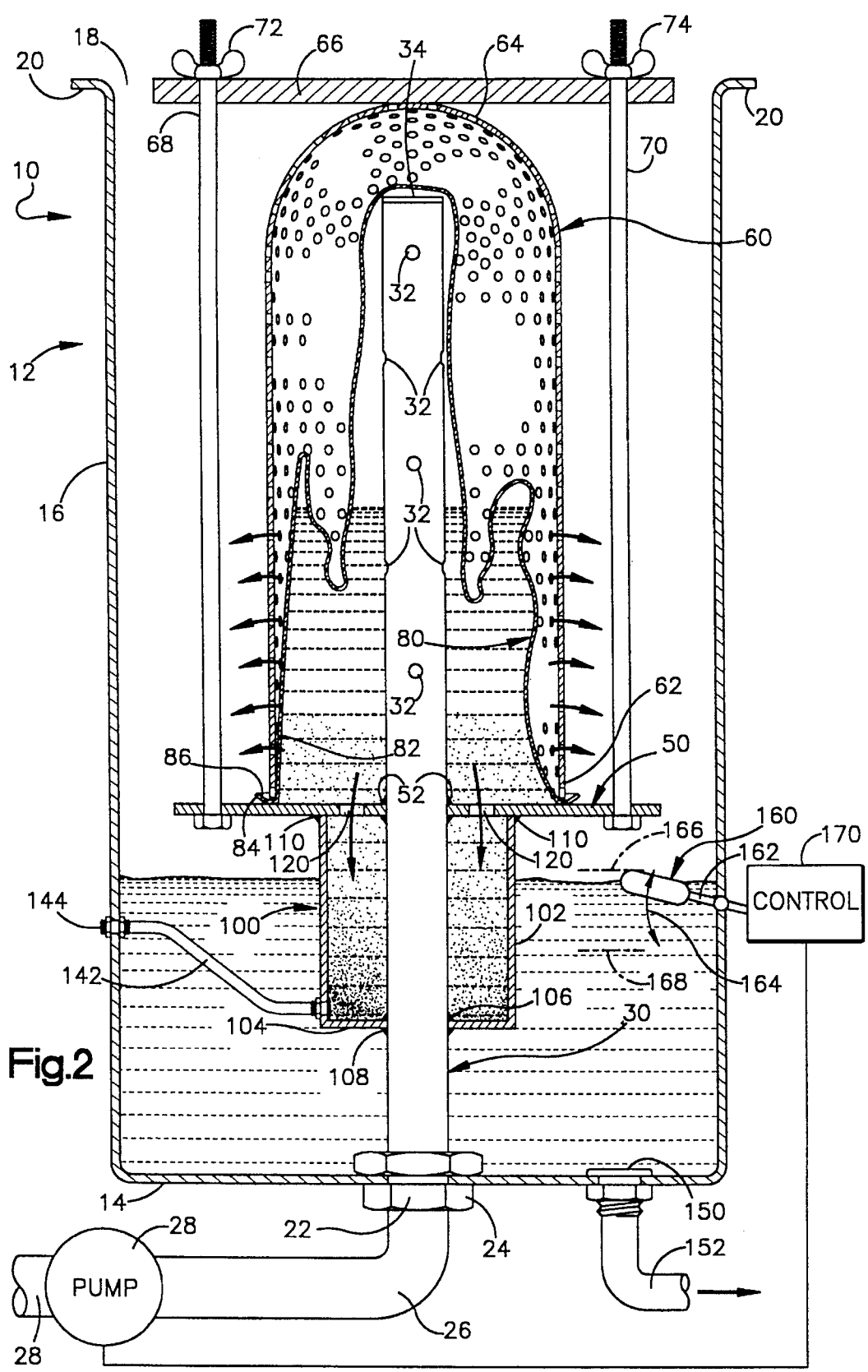

Reference is now made to the drawings wherein the showings are for purposes of illustrating a preferred embodiment only and not for purposes of limiting the same. A self-cleaning fluid filtration system 10 is illustrated in FIGS. 1 and 2 and includes a cylindrical tank 12 having a disk-shaped bottom wall 14 and a cylindrical upstanding side wall 16 which extends upwardly from the bottom wall terminating in an upper circular-shaped open end 18. The open end 18 is surrounded by an outwardly extending flange 20. The tank 12 may be constructed of metal or plastic material. The tank 12 serves as a fluid container for receiving fluid to be filtered. To this end, an inlet 22 is formed in the bottom wall 14. A suitable fitting 24 is mounted to the inlet 22. The fitting 24 is secured to a suitable conduit 26, which may be constructed of a plastic material. Dirty fluid to be filtered is received at the inlet 22 and driven by means of a pump 28 so that the fluid flows upwardly into the tank 12. A metal tube 30 has one end secured, as by threading or a weld to the inlet fitting 22. This tube extends vertically upward within tank 12.

The tube 30 extends through a central aperture in a disk-shaped metal platform 50 which is welded at 52 to the tube so that the platform 50 extends radially outward in a horizontal plane from the tube. The tube 30 is perforated, as indicated by apertures 32, at various locations between the platform 50 and the upper end of the tube. The upper end of the tube 30 carries a metal cap 34 having a central aperture therein. The cap is secured to the upper end of tube 30, as by welding. As fluid is being pumped upwardly into the tube 30, the apertures permit fluid within the tube to flow outwardly through the apertures and radially therefrom in a direction of the side wall 16 as well as vertically upward through the aperture in the cap 34.

A perforated stainless steel basket 60 is located within the tank 12 and is mounted with its open end 62 resting on the platform 50 and with its closed end 64 spaced vertically upward from cap 34. Thus, the basket 60 surrounds the upper portion of the tube 30 with the side wall of the basket being somewhat cylindrical in shape and coaxially surrounding the tube. The basket 60 is firmly held in place and pressed downwardly against the platform 50 by means of a clamp arrangement including a crossbar 66 which extends horizontally over the top end 64 of the basket. This crossbar is held in place by a pair of threaded rods 68 and 70 which extend upwardly through suitable apertures in the platform 50 and, thence, through the crossbar 66 at spaced locations thereof. A pair of wing nuts 72 and 74 are threaded onto the ends of threaded rods 68 and 70 and tightened against the crossbar 66 so the crossbar 66 exerts downwardly directed forces against the upper end 64 of basket 60, thereby holding the basket firmly in place against the platform 50.

A collapsible fluid-permeable filter bag 80 is located within the tank 12 intermediate the upper portion of the tube 30 and the perforated basket 60. The filter bag 80 has an open lower end 82 which terminates in a peripheral lip 84 which is bent back upon itself to form an annular groove 86. This lip 84 extends over the lower open end 62 of basket 60 so that the end 62 is received in the annular groove 86. The bag is held down in place against the platform 50 by means of the downwardly directed forces presented by the crossbar 66.

The filter bag 80 is preferably constructed of a relatively smooth synthetic material such as nylon or polypropylene material. Suitable filter bags for this purpose may be obtained from various suppliers such as FSI Filter Specialists, Inc. These filter bags have various filter ratings suitable for filtering light to heavy dirt loads. The filter ratings are on the order of 10 to 800 microns. In the embodiment of the invention being discussed herein, the filter bag 80 may have a filter rating on the order of 75 microns or 50 microns or 25 microns.

The filter bag 80 has an uncollapsed condition as is shown in FIG. 1 while fluid is pumped by pump 28 so as to flow through the tube 30, as indicated by arrows 90. The fluid flows radially outward through holes or perforations 32 in the tube to force the bag upwardly against the top 64 of basket 60 as well as against the side wall of the basket.

The filter bag 80 has a collapsed condition as is shown in FIG. 2 and this takes place when fluid flow terminates and the bag collapses, as shown, causing dirt clinging to the inner surface of the filter bag to fall from the walls thereof by gravity forces onto the upper surface of the platform 50.

A dirt compartment 100, which may be constructed of metal such as steel, is located in the tank 12 immediately below the platform 50. The compartment is comprised of a cylindrical wall 102 which coaxially surrounds tube 30 and a bottom disk-shaped wall 104 having a central circular aperture therein through which tube 30 extends. The bottom wall 104 is secured to the tube 30, as by welding at 106 and 108. The upper peripheral edge of side wall 102 is secured to the lower surface of platform 50 as by welding at 110.

A dirt outlet is provided in the platform 50 and takes the form of a plurality of holes 120 which extend through the platform between tube 30 and the side wall 102 of the dirt compartment 100. These dirt holes 120 permit dirty fluid and dirt to flow from within the filter bag 80 and thence through the holes 120 into the dirt compartment 100.

A dirty fluid outlet is provided at the bottom of dirt compartment 100 and this outlet includes a fitting 140 which is coupled to a conduit taking the form of a plastic hose 142 which extends to an outlet fitting 144 located in the side wall of tank 12. This permits dirty water and dirt in the dirt compartment 100 to flow out of the tank to a dirt basket or dirt drum or the like.

A clean fluid outlet is located in the bottom wall 14 of tank 12 and includes an outlet fitting 150 to which is suitably secured an outlet fluid conduit in the form of a plastic hose 152. This outlet permits escape of fluid that has been filtered by flowing through bag 80 and then through the perforated basket 60. This filter fluid may be reused as reclaimed fluid for such purposes as vehicle washing and the like.

The control of pump 28 is achieved by means of a float switch 160 and a suitable control 170. The float switch is conventional in the art and floats in the tank. The switch is provided with an insulated cable 162 which is suitably mounted in the side wall of the tank 12 to permit sufficient flexing that the float switch pivots upwardly and downwardly with fluid level changes as indicated by the arrows 164. When the switch 160 reaches an upper level as indicated by the dotted lines 166, the switch is actuated to an OFF condition whereupon the control 170 turns pump 128 OFF thereby terminating further pumping action of fluid into the tank by way of the inlet fitting 22 and tube 30. As the fluid in the tank 12 drains out by way of the dirty fluid outlet 140 and the clean fluid outlet 150, the float switch will pivot in a downward direction as the fluid level goes in a downward direction from level 166 to level 168. At fluid level 168, the switch is actuated to an ON condition whereupon the control 170 actuates the pump 28 to again cause fluid to be pumped into the tank 12 by way of inlet fitting 22 and tube 30. Each time the pump is turned OFF, the bag collapses from the condition as shown in FIG. 1 to that as shown in FIG. 2 whereupon dirt adhering or otherwise clinging to the inner surface of bag 80 will fall off and escape through holes 120 into the dirt compartment 100 and, thence, out of the tank by way of fitting 140, conduit 142, and outlet fitting 144. When the float switch 160 reaches the lower level 168, the pump is turned ON expanding the filter bag 120 up against the inner walls of the perforated basket 60.

In operation, it is seen that dirty fluid to be filtered is pumped into the tube 30 by means of pump 28 so as to flow upwardly through the tube and outwardly therefrom as is indicated by arrows 90 so that the fluid is ejected with moderate force toward the filter bag 80. The fluid is filtered as it flows through the filter bag and then through the perforations in basket 60. The basket 60 helps assure that the filter bag will not tear or rip during this process. The basket 60 with the filter bag in place is held down tightly against the platform 50 by means of crossbar 66 and thumb screws 72 and 74 which are threaded onto threaded rods 68 and 70, respectively. The filtered fluid is retained in tank 12 and released therefrom by way of the clean water outlet fitting 150 and conduit or hose 152. The fitting 150 should be selected so as to not release more water from the tank 12 than that which is being pumped into the tube 30 by pump 28. The collapse of the bag 80 is accomplished when the tank fills to a level 166 which is sensed by the float switch 160 causing control 170 to turn OFF pump 28 terminating the pumping of fluid through the filter bag. As the filter bag collapses, dirt which has adhered to the bag will fall off and escape through holes 120 into the dirt compartment 100. When the fluid level in the tank recedes to level 168, the float switch 160 is switched to an ON condition whereby control 170 turns pump 28 ON causing fluid to be pumped into the tank through tube 30 causing the filter bag 80 to expand from the condition as shown in FIG. 2 to that as shown in FIG. 1. This is done relatively quickly and this helps remove any dirt remaining on the inner surface of the filter bag. Also, the pressure produced by the pump forces the dirty fluid and dirt out of the dirt compartment 100 through fitting 140, conduit 142, and fitting 144.

From the foregoing description of the invention, those skilled in the art will perceive improvements, changes and modifications. Such improvements, changes and modifications within the skill of the art are intended to be covered by the appended claims.

Having described the invention, we claim the following:

1. A self cleaning fluid filtration system comprising:

a tank having a bottom wall and a side wall extending upwardly from said bottom wall and together forming a fluid chamber, an inlet located in said bottom wall for receiving fluid to be filtered, a tube extending from said inlet upwardly into said chamber for directing said fluid upwardly through said tube, said tube having perforations therein for directing fluid within said tube to flow outwardly therefrom, a platform carried by said tube intermediate its ends and extending radially outward therefrom toward the inner surface of said side wall of said tank, a perforated rigid basket in said chamber surrounding said tube and having an open lower end having a peripheral edge mounted on the upper surface of said platform and a closed upper end located above the upper end of said tube, a collapsible fluid-permeable filter bag located in said chamber intermediate said tube and said basket and having an open lower end having a peripheral lip extending over the lower peripheral edge of said basket between said basket and the upper surface of said platform, said filter bag having an uncollapsed condition while fluid flows through said tube and then radially against said bag displacing said bag radially outward and upwardly against said basket so that fluid flows through said filter bag and then through said basket within said tank and a collapsed condition when fluid flow terminates whereupon said bag collapses causing dirt clinging to the inner surface of said filter bag to fall from the walls thereof by gravity forces toward the upper surface of said platform, a dirt compartment located in said tank below said platform, a dirt outlet in said platform intermediate said bag and said inlet so that dirt and unfiltered fluid may flow downwardly therethrough into said dirt compartment, a dirty fluid outlet extending from said dirt compartment permitting dirt and unfiltered fluid to flow outwardly therethrough from said dirt compartment, and a clean fluid outlet extending from said tank permitting filtered fluid to flow out of said tank.

2. A system as set forth in claim 1 wherein said tube is constructed of rigid material.

3. A system as set forth in claim 2 wherein said tube is constructed of metal.

4. A system as set forth in claim 1 wherein said perforations in said tube are located in said tube only above said platform.

5. A system as set forth in claim 1 wherein said platform is disk-shaped and extends radially outward from said tube beyond the outer periphery of said basket.

6. A system as set forth in claim 5 wherein said platform is constructed of metal and is secured to said tube.

7. A system as set forth in claim 1 including hold down means for holding said basket on said platform with forces directed downwardly toward said platform.

8. A system as set forth in claim 7 wherein said hold down means includes means for adjusting said downwardly directed forces.

9. A system as set forth in claim 7 wherein said hold down means includes a crossbar extending over the top of said basket and means for securing said crossbar to said platform while directing forces downwardly against said basket.

10. A system as set forth in claim 9 wherein said hold down means includes means for adjusting said downwardly directed forces.

11. A system as set forth in claim 1 including pump means for, when ON, directing fluid to be filtered upwardly through said tube so as to then flow radially outward against said bag to maintain said bag in said uncollapsed condition so long as said pump is ON.

12. A system as set forth in claim 11 including sensing means for controlling whether said pump is turned ON or turned OFF based on the level of said fluid in said tank.

13. A system as set forth in claim 12 wherein said sensing means includes a float switch.

\* \* \* \* \*